US012780038B2

(12) United States Patent
Erhard et al.

(10) Patent No.: US 12,780,038 B2

(45) Date of Patent: Nov. 3, 2026

(54) METHOD FOR OPERATING A TRACTION BATTERY FOR A MOTOR VEHICLE, ELECTRONIC COMPUTING DEVICE, AND MOTOR VEHICLE HAVING A TRACTION BATTERY

(71) Applicant: Bayerische Motoren Werke Aktiengesellschaft, Munich (DE)

(72) Inventors: Simon Erhard, Geltendorf (DE); Marko Graser, Munich (DE); Thomas Kellner, Ismaning (DE); Christian Skrivanek, Pfaffenhofen a.d.Ilm (DE); Lukas Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/848,347

(22) PCT Filed: May 24, 2023

(86) PCT No.: PCT/EP2023/063959

§ 371 (c)(1),
(2) Date: Sep. 18, 2024

(87) PCT Pub. No.: WO2023/241895

PCT Pub. Date: Dec. 21, 2023

(65) Prior Publication Data

US 2025/0206187 A1 Jun. 26, 2025

(30) Foreign Application Priority Data

Jun. 15, 2022 (DE) ..................... 10 2022 115 102.6

(51) Int. Cl.
*B60L 58/12* (2019.01)
*B60L 58/13* (2019.01)
(Continued)

(52) U.S. Cl.
CPC ............... *B60L 58/13* (2019.02); *B60L 58/16* (2019.02); *H01M 10/44* (2013.01); *H01M 10/46* (2013.01);
(Continued)

(58) Field of Classification Search
CPC ........ B60L 58/13; B60L 58/16; H01M 10/44; H01M 10/46; H01M 10/48
See application file for complete search history.

(56) References Cited

U.S. PATENT DOCUMENTS 8,063,609 B2 11/2011 Salasoo et al.
8,336,651 B2 12/2012 Nishi et al.
(Continued)

FOREIGN PATENT DOCUMENTS

DE 10 2008 009 568 A1 8/2009
DE 10 2009 042 656 A1 3/2011
DE 10 2012 212 869 A1 1/2013

OTHER PUBLICATIONS

International Search Report (PCT/ISA/210) issued in PCT Application No. PCT/EP2023/063959 dated Aug. 28, 2023 with English translation (5 pages).
(Continued)

*Primary Examiner* — Menatoallah Youssef
*Assistant Examiner* — Esayas G Yeshaw
(74) *Attorney, Agent, or Firm* — Crowell & Moring LLP

(57) ABSTRACT

A method for operating a traction battery for a motor vehicle, which can be discharged down to a predefined minimum charging state during operation of the motor vehicle and can be charged up to a predefined maximum charging state in a charging operation, wherein, the minimum charging state is increased and/or the maximum charg-
(Continued)

ing state is decreased if a limit value is reached by the value of a predefined parameter which describes a variable property of the traction battery.

15 Claims, 1 Drawing Sheet

(51) Int. Cl.

| | |
|---|---|
| ***B60L 58/16*** | (2019.01) |
| ***H01M 10/44*** | (2006.01) |
| ***H01M 10/46*** | (2006.01) |
| ***H01M 10/48*** | (2006.01) |

(52) U.S. Cl.
CPC ...... *H01M 10/488* (2013.01); *H01M 2220/20* (2013.01)

(56) References Cited

U.S. PATENT DOCUMENTS

| | | | | |
|---|---|---|---|---|
| 9,358,969 | B2 * | 6/2016 | Yamazaki | B60W 10/08 |
| 10,700,376 | B2 * | 6/2020 | Koch | H01M 10/44 |
| 2009/0205890 | A1 | 8/2009 | Diegelmann et al. | |
| 2012/0112754 | A1 | 5/2012 | Kawai | |
| 2012/0176096 | A1 | 7/2012 | Mumelter et al. | |
| 2012/0179398 | A1 * | 7/2012 | Ueki | H01M 10/48 702/63 |
| 2013/0027048 | A1 | 1/2013 | Schwarz et al. | |
| 2014/0295307 | A1 * | 10/2014 | Toida | B60L 3/0053 429/432 |
| 2016/0221465 | A1 | 8/2016 | Kratzer et al. | |
| 2017/0299660 | A1 | 10/2017 | Saint-Marcoux et al. | |
| 2018/0134176 | A1 * | 5/2018 | Symanow | B60L 58/12 |
| 2020/0171973 | A1 * | 6/2020 | Perkins | B60L 53/14 |
| 2022/0131402 | A1 * | 4/2022 | Erhard | B60L 53/62 |
| 2023/0356623 | A1 * | 11/2023 | Araujo Xavier | H01M 10/441 |
| 2024/0361397 | A1 * | 10/2024 | Berger | G01R 31/392 |
| 2024/0399875 | A1 * | 12/2024 | Schwinghammer | B60L 3/0046 |

OTHER PUBLICATIONS

German-language Written Opinion (PCT/ISA/237) issued in PCT Application No. PCT/EP2023/063959 dated Aug. 28, 2023 with English translation (8 pages).

German-language Office Action issued in German Application No. 10 2022 115 102.6 dated Apr. 21, 2023 (5 pages).

* cited by examiner

METHOD FOR OPERATING A TRACTION BATTERY FOR A MOTOR VEHICLE, ELECTRONIC COMPUTING DEVICE, AND MOTOR VEHICLE HAVING A TRACTION BATTERY

BACKGROUND AND SUMMARY

The invention relates to a method for operating a traction battery for a motor vehicle, to an electronic computing device, and to a motor vehicle having a traction battery.

U.S. Pat. No. 8,063,609 B2 discloses a method for extending the lifetime of a vehicle battery. In the method, provision is made for an energy transmission rate into or from a vehicle energy storage unit to be adjusted depending on an estimated duration of a future possible charging situation.

A lifetime of a high-voltage battery and thus the full functionality thereof should ideally be guaranteed to be as long as possible, but at least up to the end of a service life. For this purpose, both electrochemical aging and mechanical expansion of the high-voltage battery should also be kept under control. Conventional lithium-ion batteries indicate accelerated aging as the number of charging cycles increases and mechanical expansion when they are operated with high fluctuations in the state of charge.

It is therefore an object of the present invention to provide a solution by which rapid aging of a high-voltage battery of a motor vehicle can be avoided particularly well.

This object is achieved by the subject matter of the present disclosure. Further possible configurations of the invention are also disclosed in the description and the figures.

The invention relates to a method for operating a traction battery for a motor vehicle. The traction battery is set up to provide electrical energy for an electric drive train of the motor vehicle so that the motor vehicle can be electrically driven by the electric drive train. The traction battery is in particular a high-voltage storage unit. The traction battery can be discharged to a predefined minimum state of charge during operation of the motor vehicle. This electrical energy that is discharged from the traction battery is provided for the electric drive train of the motor vehicle. Furthermore, the traction battery can be charged up to a predefined maximum state of charge in a charging operation. The maximum state of charge therefore characterizes a point up to which the traction battery can be charged or may be charged with electrical energy within a charging process.

In the method, provision is made for the minimum state of charge to be increased and/or for the maximum state of charge to be decreased if a limit value is reached by the value of a predefined parameter, wherein the predefined parameter describes a variable property of the traction battery. This value of the predefined parameter of the variable property of the traction battery steadily changes over a lifetime of the traction battery in the direction of the limit value or beyond the limit value after the limit value has been reached. This means that the value of the predefined parameter does not at any point move away from their limit value as long as the limit value has not yet been reached. The decreasing of the maximum state of charge or the increasing of the minimum state of charge limits a state of charge band in which the traction battery may be used. This decreases the degree of discharge of the traction battery per charging cycle. As a result, it is possible to achieve a longer lifetime in relation to the achievable energy throughput in comparison with operation using the original state of charge band. In this case, in particular, the minimum state of charge can be increased and/or the maximum state of charge can be decreased in such a way that a permissible resulting state of charge band is within an optimum band in which aging of the traction battery is particularly low. The state of charge band extends from the predefined minimum state of charge as the lower limit up to the predefined maximum state of charge as the upper limit. The traction battery may be used in this state of charge band. If the state of charge of the traction battery reaches the minimum state of charge, then the traction battery must be charged. If the state of charge of the traction battery reaches the predefined maximum state of charge, then a charging process of the traction battery must be terminated. In the method, therefore, the usable state of charge band of the traction battery is restricted as soon as the value of the variable property of the traction battery has reached the limit value. This means that, initially, the traction battery can be operated using a particularly large state of charge band and the state of charge band is restricted only once the predefined parameter has reached the limit value. As a result, a particularly high energy throughput can be retrieved over the lifetime of the traction battery and furthermore the traction battery can be used over a relatively long lifetime.

In one possible development of the invention, provision is made for the minimum state of charge and/or the maximum state of charge to be adjusted for the remainder of a lifetime of the traction battery. In particular, provision is made for the minimum state of charge and/or the maximum state of charge to be adjusted once and permanently for the remainder of the lifetime of the traction battery. This means that the minimum state of charge and/or the maximum state of charge is/are adjusted as soon as the limit value is reached by the value of the predefined parameter and subsequently the adjusted minimum state of charge or the adjusted maximum state of charge is/are kept constant for the remainder of the lifetime of the traction battery. As an alternative, the minimum state of charge and/or the maximum state of charge can be adjusted several times over the lifetime of the traction battery, with provision being made in particular for the usable state of charge band to be steadily reduced. Restricting the state of charge band for the remainder of the lifetime of the traction battery makes it possible to limit and thus slow down an aging process of the traction battery permanently for the remainder of the lifetime of the traction battery.

In one further possible development of the invention, provision is made for an energy throughput of the traction battery and/or a state of health to be used as parameter. The energy throughput can describe how much energy has been supplied and/or drawn over the lifetime of the traction battery. This energy throughput steadily increases during operation of the traction battery over the lifetime thereof. The state of health is what is known as the SOH of the traction battery. This state of health of the traction battery worsens over the lifetime of the traction battery. As soon as the limit value that is predefined in each case for the energy throughput and/or the state of health has been reached, the minimum state of charge and/or the maximum state of charge is/are adjusted in order to slow down an aging process of the traction battery. This can result in a particularly long service life of the traction battery. In particular, the limit value for the parameter can be predefined in a range in which development of the state of health in relation to an energy throughput of the traction battery accelerates beyond a predefined amount. This means that the limit value is in a range of a curve that describes the state of health against the energy throughput and in which a negative gradient of the curve increases over a predefined amount and therefore the curve has a significant bend downward. As a result, aging that accelerates over the lifetime of the traction battery can be slowed down, which in turn makes it possible to achieve a particularly long lifetime of the traction battery.

In one further possible development of the invention, provision is made for the minimum state of charge and/or the maximum state of charge to be adjusted linearly. This means that the increasing of the minimum state of charge and the decreasing of the maximum state of charge is effected in a ramped manner and thus continuously. A sudden significant increase in the minimum state of charge or decrease in the maximum state of charge can therefore be prevented. It is therefore possible to adjust the state of charge band particularly gently for the driver of the motor vehicle so that the driver ideally hardly notices the adjustment of the state of charge band. A sudden significant adjustment of the minimum state of charge or the maximum state of charge could be clearly, and possibly unpleasantly, perceived by the driver of the motor vehicle.

In one further possible configuration of the invention, provision is made for the minimum state of charge and/or the maximum state of charge to be adjusted over a predefined period, in particular a period of 3 to 6 months. This means that the minimum state of charge and the maximum state of charge are adjusted continuously, in particular linearly, from a predefined starting value over the predefined period—in particular the period of 3 to 6 months—to a respective new predefined value. The adjustment of the minimum state of charge and the maximum state of charge over the predefined period makes it possible to adjust the state of charge band particularly gently so that the driver can particularly easily become accustomed to the new predefined state of charge band. As an alternative, the period may be for example 1 year.

In one further possible configuration of the invention, provision is made for the minimum state of charge and/or the maximum state of charge to be adjusted while a predefined energy throughput is implemented in the traction battery and/or while a predefined change in the state of health occurs. This means that, from the time at which it is determined that the minimum state of charge and the maximum state of charge need to be adjusted, an energy throughput to be run through in the traction battery is measured and, while the predefined energy throughput is run through in the traction battery, the minimum state of charge and the maximum state of charge is adjusted steadily. In other words, the minimum state of charge or the maximum state of charge is adjusted in steps or continuously to the respective new value uniformly over a period of time that is required to implement the predefined energy throughput in the traction battery. Therefore, the quicker the predefined energy throughput is implemented in the traction battery, the quicker the minimum state of charge and the maximum state of charge are adjusted. As an alternative or in addition, the predefined change in the state of health can be used as a specification for the period of time over which the minimum state of charge and the maximum state of charge are to be adjusted continuously to the respective new predefined values. For example, it is possible to specify that the minimum state of charge is to be increased by 10 percentage points and the maximum state of charge is to be decreased by 10 percentage points over a period of time in which the state of health of the traction battery worsens by 5 percentage points. In this case, the states of charge can be adjusted for example directly proportionally to the change in the state of health. The minimum state of charge and the maximum state of charge are therefore adjusted steadily over the changing state of health of the traction battery. The predefined energy throughput and the predefined change in the state of health can be determined depending on a predefined equivalent in kilometers traveled to be run through during the change in the minimum state of charge and the maximum state of charge. This means that a number of kilometers to be traveled by the motor vehicle in theory during the adjustment is specified and the energy throughput arising in the traction battery in this case or the change in the state of health of the traction battery arising in this case is determined. The predefined energy throughput and the predefined change in the state of health can therefore be determined as what is known as a mileage equivalent. Particularly gentle adjustment of the state of charge band depending on the use of the traction battery is therefore made possible. The minimum and maximum state of charge is therefore adjusted over a time range that is defined either by a particular energy throughput, a particular period of time or a particular difference in the SOH.

The invention furthermore relates to an electronic computing device, which is set up to control a charging process of a traction battery and to adjust a minimum state of charge and/or a maximum state of charge of the traction battery in a method as has already been described in connection with the method according to the invention. The electronic computing device is therefore set up to control the traction battery in such a way that it is charged at most up to the predefined maximum state of charge or in that it is discharged at most to the predefined minimum state of charge. The electronic computing device can also adjust the state of charge limits in order to slow down the development of aging of the traction battery.

The invention furthermore relates to a motor vehicle having a traction battery, which is set up to be operated in a method as has already been described in connection with the method according to the invention. The traction battery is set up to provide electrical energy for an electric drive train of the motor vehicle so that the motor vehicle can be driven by electrical energy via the electric drive train. The method makes possible a particularly long lifetime of the traction battery and consequently a particularly long lifetime of the motor vehicle.

In one possible development of the method, provision is made for the motor vehicle to be in the form of a hybrid vehicle. This means that the motor vehicle comprises both the electric drive train and a drive train based on an internal combustion engine. Situations in which the motor vehicle cannot be driven by the electric drive train due to the restricted state of charge band can be balanced using the internal combustion engine. Despite the minimum state of charge being reached, therefore, the motor vehicle can be driven by the internal combustion engine and can continue to be used until there is a possibility to charge the motor vehicle. Using the method, in the case of a hybrid vehicle with a restricted state of charge band, although fewer kilometers are covered electrically per journey, more electrical kilometers are possible in total over the lifetime of the motor vehicle due to the increased lifetime of the traction battery.

In one further possible configuration of the invention, provision is made for the motor vehicle to comprise a display device, which is set up to output the minimum state of charge as a 0 percent state of charge and the maximum state of charge as a 100 percent state of charge. This means that only the available state of charge band is displayed to the driver of the motor vehicle as a charging spread of 0 percent to 100 percent. In this case, a state of charge displayed as 0 percent means that the specified or the adjusted minimum state of charge is available in the traction battery. If the state of charge of 100 percent is displayed by the display device, then this means that the specified or the adjusted maximum state of charge is available in the electrical traction battery. In other words, the minimum state of charge may be for example 20 percent in real terms, but the display device displays this as 0 percent. The maximum state of charge may be 80 percent in real terms, but this is output as a 100 percent state of charge. This can prevent the electrical traction battery from being charged beyond the maximum state of charge or emptied below the minimum state of charge. This display of the display device may therefore easily prompt the driver to maintain the specified or adjusted state of charge band of the traction battery. This achieves the particularly long lifetime of the traction battery over a particularly large number of charging cycles.

Advantages and advantageous developments of the method according to the invention can be considered as advantages and advantageous development of the electronic computing device according to the invention and the motor vehicle according to the invention, and vice versa.

Further features of the invention may emerge from the claims, the figures and the description of the figures. The features and combinations of features mentioned above in the description and the features and combinations of features shown below in the description of the figures and/or in the figures alone can be used not only in the respectively stated combination but also in other combinations or alone, without departing from the scope of the invention.

DETAILED DESCRIPTION OF THE DRAWINGS

As a result of aging of a traction battery, a range ER that can be achieved by a motor vehicle comprising the traction battery purely using electrical energy decreases over a lifetime of the traction battery.

Figure 1:
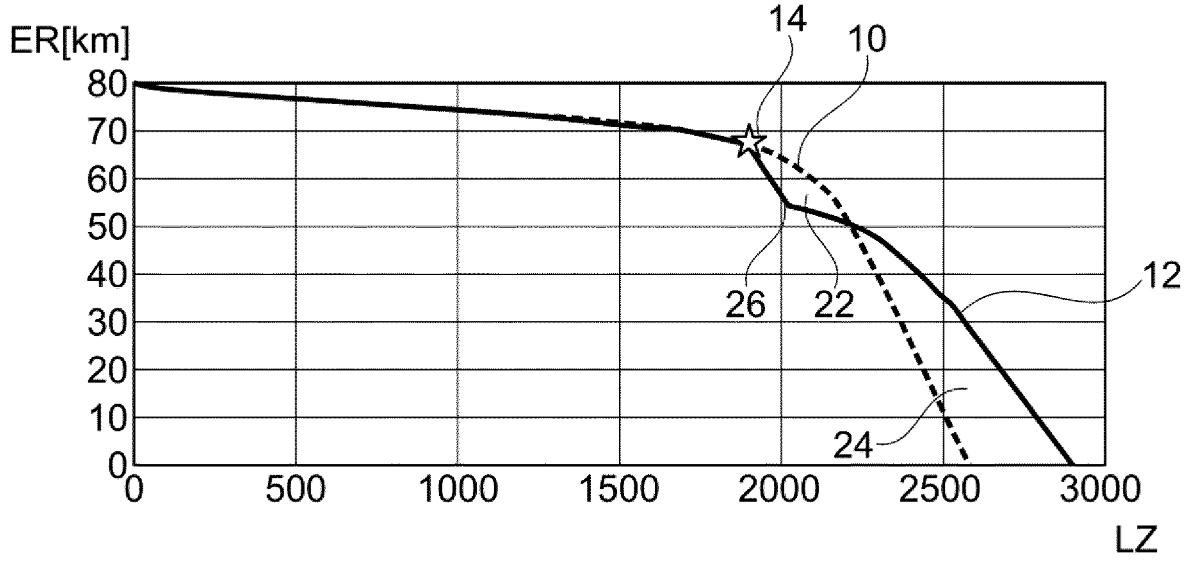
FIG. 1 shows a graph with a range curve for an electrical traction battery, in which a range that can be achieved by an electric drive train of the motor vehicle is plotted against a number of equivalent full charging cycles, wherein, at a time at which a limit value is reached by the value of a predefined parameter that describes a variable property of the traction battery, a function for extending the range of the electric drive train is started, in the scope of which a permissible state of charge band of the traction battery is restricted.

FIG. 1 shows a graph in which the range ER for driving the motor vehicle with energy from the electrical traction battery by an electric drive train in kilometers is plotted against an equivalent in full charging cycles LZ. A first curve 10 and a second curve 12 are illustrated in this case. The first curve 10 represents operation of the traction battery in which a permissible state of charge band 20 of the traction battery is unchanged over a lifetime of the traction battery. The second curve 12 represents operation of the traction battery in which a permissible state of charge band 20 of the traction battery is adjusted at a starting point 14 denoted by a star. In other words, a function used to increase a range available to the motor vehicle by the drive train over the lifetime of the traction battery is started at the starting point 14. As can be seen particularly well in FIG. 1, the second curve 12 is arranged above the first curve 10 after a breakeven point, which means that, at a certain number of equivalently run charging cycles LZ, the range ER of the traction battery with the adjusted state of charge band 20 that can be achieved purely using electrical energy is greater than that of the traction battery with the unchanged state of charge band 20. The function can therefore be used to achieve a particularly long range ER that can be achieved with electrical energy at a high number of equivalently run full charging cycles LZ. As can be seen in FIG. 1, the range ER in the traction battery with the started function with a higher number of equivalently run full charging cycles LZ decreases to 0 in comparison with the traction battery without a started function. Therefore, the traction battery with the started function can be used for longer and consequently has a longer lifetime.

An increasing of a predetermined minimum state of charge 16 of the traction battery and/or a decreasing of a predetermined maximum state of charge 18 of the traction battery started at the starting point 14. This restricts the maximum usable state of charge band 20. This maximum permissible state of charge band 20 is also referred to as depth of discharge.

Figure 2:
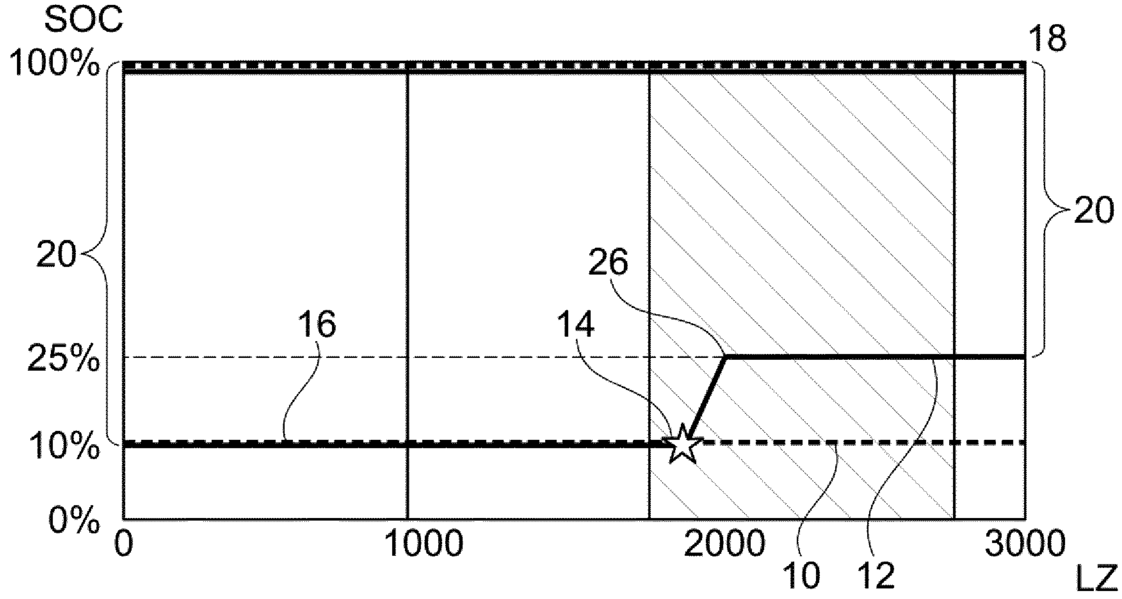
FIG. 2 shows a graph in which the state of charge band for the equivalent in full charging cycles is plotted and in which, from the start of the function, the permissible state of charge band is continuously linearly restricted and is kept in this restricted state until the end the lifetime of the traction battery.

FIG. 2 shows a graph in which the state of charge SOC is plotted against the equivalent in full charging cycles LZ. The starting point 14 at which the restriction of the permissible state of charge band is started is likewise denoted in FIG. 2 by a star. In the process shown in FIG. 2, from the starting point 14, the minimum state of charge 16 is increased linearly and thus in a ramped manner from a permissible minimum state of charge of 10% to a permissible minimum state of charge of 25%. In this case, the respective operating modes in which the permissible state of charge band 20 is restricted or not restricted are illustrated in FIG. 2 using the first curve 10 and the second curve 12 analogously to FIG. 1. In the case of the first curve 10, both the predefined minimum state of charge 16 and the predefined maximum state of charge 18 remain unchanged over a total lifetime of the traction battery. In the case of the second curve 12, the predefined maximum state of charge 18 remains at 100% over the total lifetime of the traction battery, whereas the minimum state of charge 16 is predetermined at a 10% state of charge up to the starting point 14 and is adjusted linearly to a value of 25% from the starting point 14 and is maintained at the value of 25% until the end of life of the traction battery. By restricting the permissible state of charge band 20, the traction battery is therefore no longer discharged below the adjusted minimum state of charge 16 of 25% during operation of the motor vehicle, which achieves a lower depth of discharge. This lower maximum possible depth of discharge can reduce electrochemical aging and mechanical expansion in the traction battery. This can increase a lifetime of the traction battery considering the equivalent in charging cycles LZ, as can be seen particularly well in FIG. 1.

The second curve 12 reaches the range ER of 0 km at approximately 2900 equivalent full charging cycles, whereas the first curve 10, for which the adjustment of the permissible state of charge band 20 is stopped, already reaches the range ER of 0 km that can be achieved by the electric drive train at approximately 2600 equivalent full charging cycles LZ. Therefore, by using the function, the traction battery can be used for 300 equivalent full charging cycles LZ more.

As can also be seen in FIG. 1, from the starting point 14, the restriction of the permissible state of charge band 20 temporarily reduces the range ER that can be achieved by the electric drive train below the range ER that can be achieved using the unrestricted state of charge band 20. This can be identified in the decrease of the second curve 12 below the first curve 10 from the starting point 14. However, the second curve 12 intersects the first curve 10 over the lifetime of the traction battery and therefore with an increasing number of equivalent full charging cycles LZ due to the slowed aging of the traction battery as a result of the restricted permissible state of charge band 20 at the breakeven point. Consequently, there is a range loss 22 shortly after the start of the restriction of the permissible state of charge band 20 of the second curve 12 in comparison with the first curve 10. However, at a higher number of equivalent full charging cycles LZ, there is a range gain 24 of the second curve 12 in comparison with the first curve 10 and thus during operation with the restricted state of charge band 20 due to the slowed aging of the traction battery.

Provided the motor vehicle is a hybrid vehicle, the range loss 22 can be balanced using an internal combustion engine of the hybrid vehicle. This means that the hybrid vehicle is driven using the internal combustion engine as soon as the traction battery has been discharged to the adjusted minimum state of charge 16. A method for operating the traction battery in which the permissible state of charge band 20 is restricted from the starting point 14 by virtue of the minimum state of charge 16 being increased and/or the maximum state of charge 18 being decreased is particularly advantageous in the case of a hybrid vehicle. This method can also be used in a pure electric vehicle.

As can be seen in both FIG. 1 and FIG. 2, the minimum state of charge 16 is increased linearly and therefore in a ramped manner starting from the starting point 14 up to a ramp end point 26. As a result, on the one hand the restriction of the permissible state of charge band 20 can be experienced particularly gently by a driver and on the other hand the range loss 22 can be kept particularly low. As an alternative to the ramped adjustment of the minimum state of charge 16 and/or the maximum state of charge 18, the minimum state of charge 16 and/or the maximum state of charge 18 can be adjusted over a predefined period, in particular a period of 3 to 6 months and/or over a predefined kilometer equivalent. In this case, the kilometer equivalent, which is an equivalent for a number of kilometers covered by the motor vehicle, can be converted into an implemented energy throughput in the traction battery or into a predefined change in the state of health of the traction battery to be completed. For example, it is possible to specify that the minimum state of charge 16 is to be shifted from the starting value of 10% to the target value to be reached of 25% uniformly over an equivalent of 1000 traveled kilometers. For this purpose, this kilometer equivalent can be converted to the corresponding energy throughput of the traction battery implemented in this case or the change in the state of health of the traction battery occurring here. If it is therefore determined that the traction battery has passed through the determined change in the state of health proceeding from the starting point 14, then it is determined that the kilometer equivalent has been passed. If it is determined that the determined energy throughput has been passed in the traction battery starting from the starting point 14, it is concluded that the specified equivalent in kilometers has been traveled by the motor vehicle. It is thus possible to adjust the permissible state of charge band 20 depending on a use of the traction battery. The adjustment takes place more quickly if the traction battery is used more intensively than if the traction battery is used less intensively.

If a limit value is reached by the value of a predefined parameter that describes a variable property of the traction battery, then it is determined that the starting point 14 is present and consequently the adjustment of the permissible state of charge band 20 is started. In particular the energy throughput of the traction battery and/or the state of health can be used as parameter. If the energy throughput established in the traction battery thus reaches the limit value specified for this energy throughput, the starting point 14 is then set and therefore the minimum state of charge 16 is increased or the maximum state of charge 18 is decreased. If a limit value specified for a state of health of the traction battery is reached, then the starting point 14 is set and consequently the minimum state of charge 16 is increased and/or the maximum state of charge 18 is decreased. The starting point 14 at which the minimum state of charge 16 is increased and/or the maximum state of charge 18 is decreased is thus specified by the energy throughput of the traction battery or by the state of health of the traction battery.

The state of health can be determined depending on the energy throughput of the traction battery and/or respective states of charge of the traction battery over respective charging processes.

In order to be able to achieve a particularly long lifetime of the traction battery, provision is made for the permissible state of charge band 20 to be in a band in which aging of the traction battery is minimal. For this purpose, the permissible state of charge band 20 may be for example in a band of 20% as the minimum state of charge 16 to 70% as the maximum state of charge 18.

In order to prevent the traction battery from being discharged below the minimum state of charge 16 or from being charged above the maximum state of charge 18, provision may be made for the minimum state of charge to be represented as a 0% state of charge and for the maximum state of charge to be represented as a 100% state of charge in the motor vehicle. This can prompt the driver of the motor vehicle to look for a possible way to charge the motor vehicle as soon as the displayed state of charge approaches the 0% and therefore the real state of charge of the traction battery approaches the minimum state of charge 16. As a result, the permissible state of charge band 20 can be complied with particularly reliably.

The method makes possible a particularly long range ER that can be achieved using electrical energy by reducing the permissible state of charge band 20 of the traction battery. An aging process of conventional lithium-ion batteries indicates accelerated aging in the case of large used state of charge bands 20 at a high number of charging cycles. A greater number of equivalent full charging cycles LZ can be achieved in a restricted usable state of charge band 20 in comparison with a non-restricted state of charge band 20, which results in a longer lifetime of the traction battery.

The present disclosure is based on the knowledge that there is high mechanical loading on the traction battery at a low state of charge, which over time leads to increased deposits of electrolytes on an anode. If this layer of deposits becomes too thick, then lithium is deposited, which leads to accelerated aging in the case of a very high number of charging cycles. The described method for operating the traction battery limits the mechanical loading on the traction battery, which can slow down the deposition of lithium deposits.

By restricting the permissible state of charge band 20, a lower electrical range ER is temporarily available to the driver, as can be seen in FIG. 1, wherein, in addition to the longer lifetime of the traction battery, the driver has a longer range ER of the electric drive train from the breakeven point due to the better state of health. The method therefore makes possible a positive effect in the long term on the range ER that can be achieved by the electric drive train since the advantage in terms of aging overcompensates for the reduction in the permissible state of charge band 20.

The adjustment of the permissible state of charge band 20 is activated when the value of the specified parameter of the traction battery reaches the time-independent limit value. The starting point 14 is therefore dependent on the electrical component and the power consumption of the motor vehicle based on the driving behavior of the driver who controls the motor vehicle. Consequently, the respective mileage of the motor vehicle for the starting point 14 for different motor vehicles is different depending on the driving behavior of the associated driver.

Overall, the present disclosure indicates how an electrical range saving function can be implemented.

LIST OF REFERENCE SIGNS

10 First curve
12 Second curve
14 Starting point
16 Minimum state of charge
18 Maximum state of charge
20 Permissible state of charge band
22 Range loss
24 Range gain
26 Ramp end point
ER Range of the electric drive train
SOC State of charge
LZ Equivalent of full charging cycles

The invention claimed is:

1. A method for operating a traction battery for a motor vehicle, which can be discharged down to a predefined minimum state of charge during operation of the motor vehicle and can be charged up to a predefined maximum state of charge in a charging operation, the method comprising:

increasing the minimum state of charge and/or decreasing the maximum state of charge in response to a limit value being reached by a value of a predefined parameter that describes a variable property of the traction battery, wherein the predefined parameter comprises a state of health (SOH) of the traction battery corresponding to a distance traveled by the motor vehicle.

2. The method according to claim 1, wherein:

the minimum state of charge and/or the maximum state of charge is/are adjusted for a remainder of a lifetime of the traction battery.

3. The method according to claim 1, wherein the predefined parameter further comprises:

an energy throughput of the traction battery.

4. The method according to claim 1, comprising:

adjusting the minimum state of charge and/or the maximum state of charge linearly.

5. The method according to claim 1, comprising:

adjusting the minimum state of charge and/or the maximum state of charge over a predefined period of 3 to 6 months.

6. The method according to claim 1, comprising:

adjusting the minimum state of charge and/or the maximum state of charge while a predefined energy throughput is implemented in the traction battery and/or while a predefined change in the state of health (SOH) occurs.

7. An electronic computing device configured to:

control a charging process of a traction battery for a motor vehicle which can be discharged down to a predefined minimum state of charge during operation of the motor vehicle and can be charged up to a predefined maximum state of charge in a charging operation; and adjust the minimum state of charge and/or the maximum state of charge of the traction battery in response to a limit value being reached by a value of a predefined parameter that describes a variable property of the traction battery, wherein the predefined parameter comprises a state of health (SOH) of the traction battery corresponding to a distance traveled by the motor vehicle.

8. The electronic computing device according to claim 7, wherein:

the minimum state of charge and/or the maximum state of charge is/are adjusted for a remainder of a lifetime of the traction battery.

9. The electronic computing device according to claim 7, wherein the predefined parameter further comprises:

an energy throughput of the traction battery.

10. The electronic computing device according to claim 7, configured to:

adjust the minimum state of charge and/or the maximum state of charge linearly.

11. The electronic computing device according to claim 7, configured to:

adjust the minimum state of charge and/or the maximum state of charge over a predefined period of 3 to 6 months.

12. The electronic computing device according to claim 7, configured to:

adjust the minimum state of charge and/or the maximum state of charge while a predefined energy throughput is implemented in the traction battery and/or while a predefined change in the state of health (SOH) occurs.

13. A motor vehicle comprising:

a traction battery; and the electronic computing device according to claim 7.

14. The motor vehicle according to claim 13, wherein:

the motor vehicle is a hybrid vehicle.

15. The motor vehicle according to claim 13, further comprising:

a display device configured to output the minimum state of charge as a 0% state of charge and the maximum state of charge as a 100% state of charge.

* * * * *